United States Patent [19]
Chung et al.

[11] Patent Number: 6,008,792
[45] Date of Patent: Dec. 28, 1999

[54] N×N WINDOW PROCESSING METHOD AND SYSTEM FOR AN IMAGE PROCESSING SYSTEM

[75] Inventors: Nak-ho Chung, Seoul; Yong-Woo Park; Jung-Il Park, both of Suwon, all of Rep. of Korea

[73] Assignee: Samsung Electronics Co., Ltd., Kyungki-do, Rep. of Korea

[21] Appl. No.: 08/772,125

[22] Filed: Dec. 20, 1996

[30]     Foreign Application Priority Data

Dec. 20, 1995  [KR]   Rep. of Korea ....................... 95 52612

[51] Int. Cl.$^6$ ..................................................... G09G 5/00
[52] U.S. Cl. .......................... 345/132; 345/132; 345/344; 345/340
[58] Field of Search .................................. 345/118, 434, 345/205, 344, 340, 505, 509, 513

[56]                 References Cited

U.S. PATENT DOCUMENTS

| | | | |
|---|---|---|---|
| 4,672,369 | 6/1987 | Preiss et al. ............................ | 345/132 |
| 4,853,876 | 8/1989 | Hibino et al. ........................... | 345/199 |
| 5,268,773 | 12/1993 | Park et al. .............................. | 358/466 |
| 5,515,480 | 5/1996 | Frazier .................................... | 395/109 |
| 5,600,346 | 2/1997 | Kamata et al. ......................... | 345/120 |
| 5,748,174 | 5/1998 | Wong et al. ............................ | 345/118 |

*Primary Examiner*—Steven J. Saras
*Assistant Examiner*—John G. Lim
*Attorney, Agent, or Firm*—Sughrue, Mion, Zinn, Macpeak & Seas, PLLC

[57]                    ABSTRACT

A window generating circuit of an image processing apparatus which processes an image is provided. The circuit includes a main controller, a memory device, first, second and third registers, and a window generator. The main controller inputs an original clock signal and generates first and second line memory read control signals, first and second line memory write control signals, a pixel clock, and address signals for first and second line memories based on the original clock signal. The memory device contains the first and second line memories. The first register stores current pixel data in accordance with the pixel clock, and the current pixel data relates to a current line of pixels of the image. The second register stores first line memory data output from the first line memory in accordance with the first line memory read control signal, and the first line memory data relates to a first line of pixels which precedes the current line of pixels. The third register stores second line memory data output from the second line memory in accordance with the second line memory read control signal, and the second line memory data relates to a second line of pixels which precedes the first line of pixels. The window generator inputs the current pixel data, the first line memory data, and the second line memory data from the first, second and third registers, respectively, and generates an n×n window of data based on such data. Also, a method performed by the circuit is also provided.

26 Claims, 12 Drawing Sheets

PIXEL VALUE →

| ① | ② | ③ | ④ | ⑤ | ⑥ | · · · · · · · · · | ⑰㉘ |
|---|---|---|---|---|---|---|---|
| 10 | 10 | 5 | 5 | 5 | 10 | · · · · · · · · · | |
| | | | | | | · · · · · · · · · | |

*Fig. 1*

| C−1 | C | C+1 |
|---|---|---|
| −1 | +2 | −1 |

*Fig. 2*

| ① | ② | ③ | ④ | ⑤ | · · · · · | ⑰㉘ |
|---|---|---|---|---|---|---|
| 10 | 10 | 5 | 5 | 5 | · · · · · | |
| 10 | 11.25 | 3.75 | 5 | 3.75 | · · · · · | |

*Fig. 3*

| −1 | −1 | −1 |
|---|---|---|
| −1 | 8 | −1 |
| −1 | −1 | −1 |

*Fig. 4*

N×N WINDOW PROCESSING METHOD AND SYSTEM FOR AN IMAGE PROCESSING SYSTEM

RELATED APPLICATIONS

The present application is based upon Korean Application No. 52612/1995 which is incorporated herein by reference for all purposes.

FIELD OF THE INVENTION

The present invention relates to a window processing method and system for an image processing system. More particularly, the invention relates to an n×n window processing method and system for sequentially storing pixel values of a previous line and a line before the previous line in a random access memory (RAM) and for efficiently managing the stored pixel values to calculate a value of a current pixel.

BACKGROUND OF THE INVENTION

Generally, in high definition image processing, image data corresponding to an image is input via a scanner. Then, the image data is typically transmitted after enhancing the data relating to an edge portion of the image so that the image can be transmitted with a high definition. For example, when text is scanned via a facsimile machine, the edges of various letters may be enhanced so that the resolution and definition of the transmitted letters is high.

In order to process an image to enhance its edges, the data of an A4 size input via a scanner is stored in 1728 facsimile data buffers and processed by software. Specifically, the current pixel value of the data stored in the data buffer is compared with adjacent pixel values before determining whether the current pixel value should be black or white. As a result, the dark portions of the corresponding text become even darker and the bright portions become even brighter, thereby producing the high definition of the text.

When an image is processed in one dimension, the pixel values as shown in FIG. 1 are processed to determine if the pixels should be black or white. In particular, as shown in FIG. 2, the current pixel value is weighted by a factor of +2, and the pixel values to the left and right of the current pixel value are weighted by a factor of −1. Then, the current pixel value is enhanced as follows. First, the weighted values of the left pixel, the right pixel, and the current pixel are combined to produce a combined weighted value. Then, the weighted value is divided by the magnitude of the combined weighting factors (e.g. $|-1|+|+2|+|-1|=4$), and the combined weighted value is divided by such magnitude to produce a calculation value. Finally, the current pixel value is enhanced by adding the calculation value to the current pixel value.

For example, FIG. 1 is a diagram of pixels [1], [2], [3], . . . [1728], and the pixels [1], [2], [3], [4], [5], and [6] respectively have pixel values which equal 10, 10, 5, 5, 5, and 10. Accordingly, if pixel [2] is the current pixel and is processed according the method shown in FIG. 2, the pixel value 10 of the pixel [2] is enhanced to produce the enhanced pixel value 11.25. Specifically, the current pixel value 10 of the pixel [2] is weighted by a factor of +2 to produce a weighted current pixel value of 20, the left pixel value 10 of the pixel [1] is weighted by a factor of −1 to produce a weighted left pixel value −10, and the right pixel value 5 of the pixel [3] is weighted by a factor of −1 to produce a weighted right pixel value −5. Then, the weighted current, left, and right pixel values are combined to produce a combined weighted pixel value +5 (i.e. −10+20−5), and the combined weighted pixel value is divided by the magnitude of the combined weighting factors (i.e. 4) to produce a calculation value 1.25. Then, the calculation value is added to the current pixel value 10 of the pixel [2] to produce the enhanced pixel value 11.25.

The enhanced pixel values of pixels [2] to [5] are illustrated in FIG. 3. Since the enhanced pixel values of pixels [2], [3], and [5] are different than the corresponding original pixel values, an image having a higher definition can be obtained.

When the image is processed in one dimension in the above manner, the image can be processed without major problems since only the current, left, and right pixel values need to be stored and processed via software. However, when an image is processed in two dimensions, the image cannot be efficiently processed. For example, as shown in FIG. 4, a current pixel is two dimensionally processed by weighting its pixel value by a factor of 8 and by weighting the eight pixels surrounding the current pixel by a factor of −1. Then, the nine weighted values are processed to produce the enhanced pixel value for the current pixel. Since nine pixels are needed to two-dimensionally process the current pixel value, 1728×2 buffers are required for the processing. The reason for the large number of buffers is that all the pixel values with respect to the previous line and the line before the previous line need to be stored. Accordingly, the two dimensional processing method is disadvantageous because a lot of buffers are needed for software processing and the calculation time increases. Thus, the processing speed is dramatically reduced.

SUMMARY OF THE INVENTION

An object of the present invention is to provide a window generating circuit and method in which the number of memory buffers is reduced and the processing speed is increased. Furthermore, an object of the invention is to use a random access memory (RAM) to efficiently manage a two-dimensional data window which is used for enhancing the edges of an image and other image processing methods such as error diffusion and wave form dithering.

In order to achieve the above and other objects, a window generating circuit of an image processing apparatus which processes an image is provided. Specifically, the circuit comprises: a main controller which inputs an original clock signal and generates a first line memory read control signal, a second line memory read control signal, a first line memory write control signal, a second line memory write control signal, a pixel clock, and address signals for first and second line memories based on said original clock signal; a memory device which comprises said first line memory and said second line memory; a first register which stores current pixel data in accordance with said pixel clock, wherein said current pixel data relates to a current line of pixels of said image; a second register which stores first line memory data that is output from said first line memory in accordance with said first line memory read control signal, wherein said first line memory data relates to a first line of pixels which precedes said current line of pixels; a third register which stores second line memory data that is output from said second line memory in accordance with said second line memory read control signal, wherein said second line memory data relates to a second line of pixels which precedes said first line of pixels; and a window generator which inputs said current pixel data from said first register, said first line memory data from said second register, and said second line memory data from said third register and which generates an n×n window of data based on said current pixel data, said first line memory data, and said second line memory data, wherein said n×n window of data is generated in synchronicity with said pixel clock and wherein n is a positive integer greater than two.

In order to further achieve the above and other objects, a window generating method for efficiently managing pixel data to generate an n×n window of data to calculate a data value of a current pixel of an image is provided. In particular, the method comprises the steps of: (a) inputting current pixel data relating to a current line of pixels of said image, first line memory data relating to a first line of pixels preceding said current line of pixels, and second line memory data relating to a second line of pixels preceding said first line of pixels; (b) sequentially storing said second line memory data in a second line memory of a memory device and said first line memory data in a first line memory of said memory device; (c) inputting an original clock signal; (d) generating a pixel clock based on said original clock signal; and (e) processing said current pixel data, said first line memory data, and said second line memory data in accordance with said pixel clock and generating said n×n window of data, wherein n is a positive integer greater than two.

BRIEF DESCRIPTION OF THE DRAWINGS

The above and other features and advantages of the present invention will be readily understood with reference to the following detailed description taken in conjunction with the accompanying drawings, in which:

FIG. 1 shows pixel values of various pixels in one dimension;

FIG. 2 shows weighting factors used for one-dimensionally processing the pixels of FIG. 1;

FIG. 3 shows the pixel values of FIG. 1 and the enhanced pixel values of the pixels after they are processed;

FIG. 4 shows weighting factors used for two-dimensionally processing pixels;

DETAILED DESCRIPTION OF THE PREFERRED EMBODIMENTS

The following description of the preferred embodiments discloses specific circuit configurations and components. However, the preferred embodiments are merely examples of the present invention, and thus, the specific components described below are only used to more easily describe such embodiments and to provide an overall understanding of the present invention. Accordingly, one skilled in the art will readily recognize that the present invention is not limited to such specific components. Furthermore, the descriptions of various features and structures of the present invention which would be known to one skilled in the art are omitted for the sake of clarity and brevity.

Figure 5:
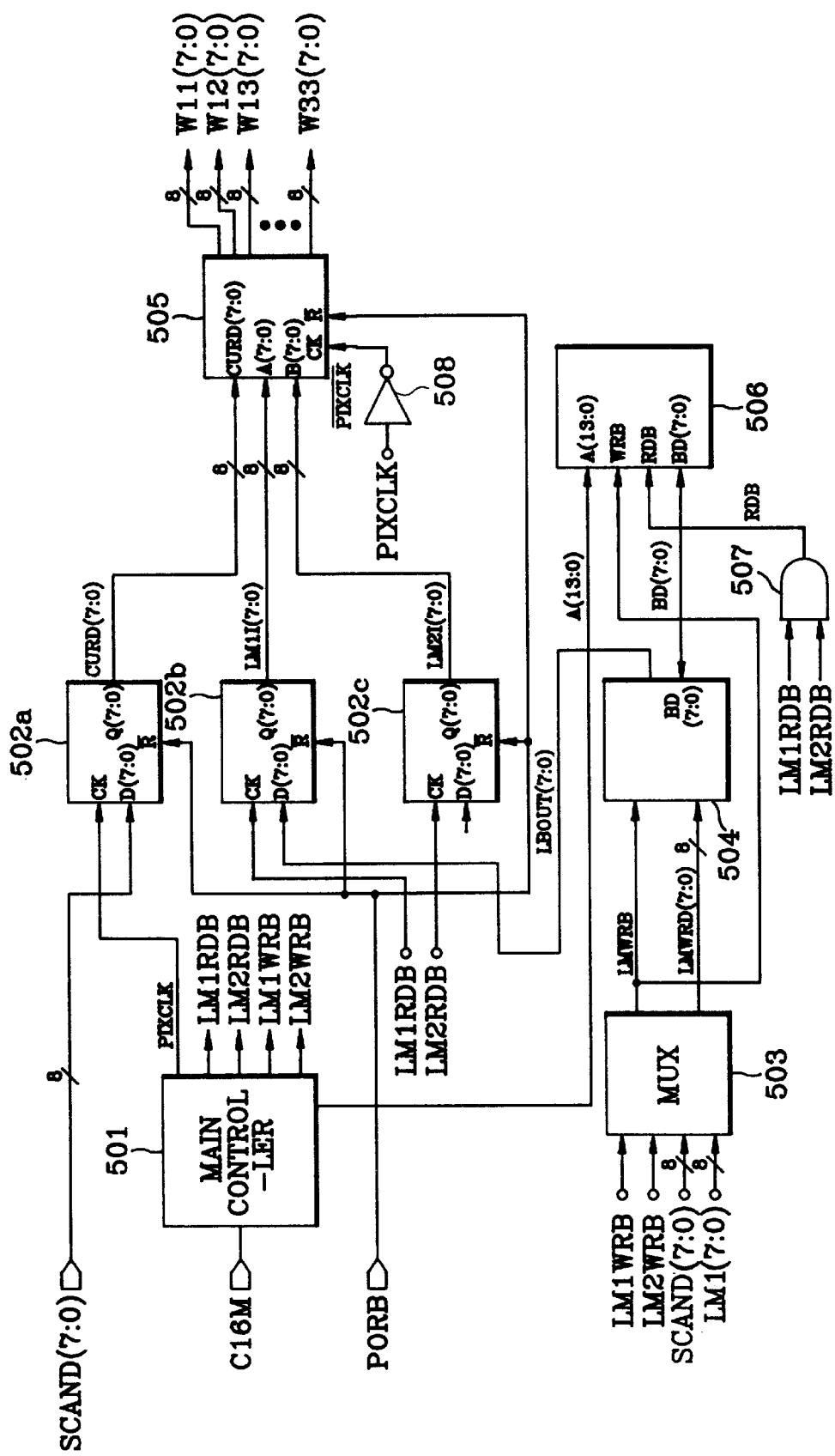
FIG. 5 illustrates an n×n window processing system according to one embodiment of the present invention.

One embodiment of an n×n window processing system according to the present invention is illustrated in FIG. 5. Specifically, the system comprises a main controller 501, first through third registers 502a to 502c, a multiplexer 503, a data transmission direction selector 504, a window generator 505, and a random access memory (RAM) 506.

The main controller 501 inputs a clock signal C16M and generates various output signals. For example, the controller 501 generates a pixel clock PIXCLK, a first line memory read control signal LM1RDB, a second line memory read control signal LM2RDB, a first line memory write control signal LM1WRB, a second line memory write control signal LM2WRB, and a line memory address signal A(13:0). In the present example, the clock C16M has a frequency of 16.384 MHz.

The first register 502a inputs scanned pixel data SCAND (7:0) via a data port, inputs the pixel clock PIXCLK via a clock port, and outputs corresponding current data CURD (7:0). The second register 502b inputs line memory data LBOUT(7:0) via a data port, inputs the first line memory read control signal LM1RDB via a clock input port, and outputs corresponding first line memory data LM1I(7:0). The third register 502c inputs the line memory data LBOUT (7:0) via a data port, inputs the second line memory read control signal LM2RDB via a clock input port, and outputs corresponding second line memory data LM2I(7:0). Furthermore, the registers 502a to 502c are all reset by a power on reset signal PORB.

The multiplexer 503 inputs the first and second line memory write control signals LMLWRB and LM2WRB, the scanned pixel data SCAND(7:0), and the first line memory data LM1I(7:0) and outputs a selected line memory write control signal LMWRB and line memory write data LMWRD(7:0). The data transmission direction selector 504 inputs the control signal LMWRB, inputs the write data LMWRD(7:0), inputs or outputs RAM data BD(7:0), and outputs the line memory data LBOUT(7:0). Specifically, based on the value of the selected line memory write control signal LMWRB, the selector 504 outputs the write data LMWRD(7:0) to the RAM 506 as the RAM data BD(7:0) or inputs the RAM data BD(7:0) from the RAM 506 and outputs such data BD(7:0) to the registers 502b and 502c as the line memory data LBOUT(7:0).

An AND gate 507 inputs the first and second line memory read control signals LM1RDB and LM2RDB, performs an AND operation on such signals LM1RDB and LM2RDB, and outputs a read control signal RDB. The RAM 506 inputs the address signal A(13:0) from the main controller 501, the selected line memory write control signal LMWRB from the multiplexer 503, and the read control signal RDB from the AND gate 507. Furthermore, the RAM 506 writes the RAM data BD(7:0) to or reads the data BD(7:0) from the address location defined by the signal A(13:0) based on the values of the write control signal LMWRB and the read control signal RDB.

An inverter 508 inputs the pixel clock PIXCLK and outputs an inverted pixel clock PIXCLK\. The window generator 505 inputs the current data CURD(7:0), the first line memory data LM1I(7:0), and the second line memory data LM2I(7:0) via its data input ports, inputs the inverted pixel clock PIXCLK\ via a clock port, and inputs a power on reset signal PORB via a reset port. Based on the input signals, the generator 506 outputs window signals W11(7:0), W12(7:0), W13(7:0), W21(7:0), W22(7:0), W23(7:0), W31 (7:0), W32(7:0), and W33(7:0). Accordingly, the window generator 505 generates a 3×3 window from based on a current line of pixels (i.e. the current data CURD(7:0)), a previous line of pixels (i.e. the first line memory data LM1I(7:0)), and a line of pixels before the previous line of pixels (i.e. the second line memory data LM1I(7:0)). Moreover, the RAM 506 contains first and second line memories for storing the first and second line memory data LM1I(7:0) and LM2I(7:0).

Figure 6A:
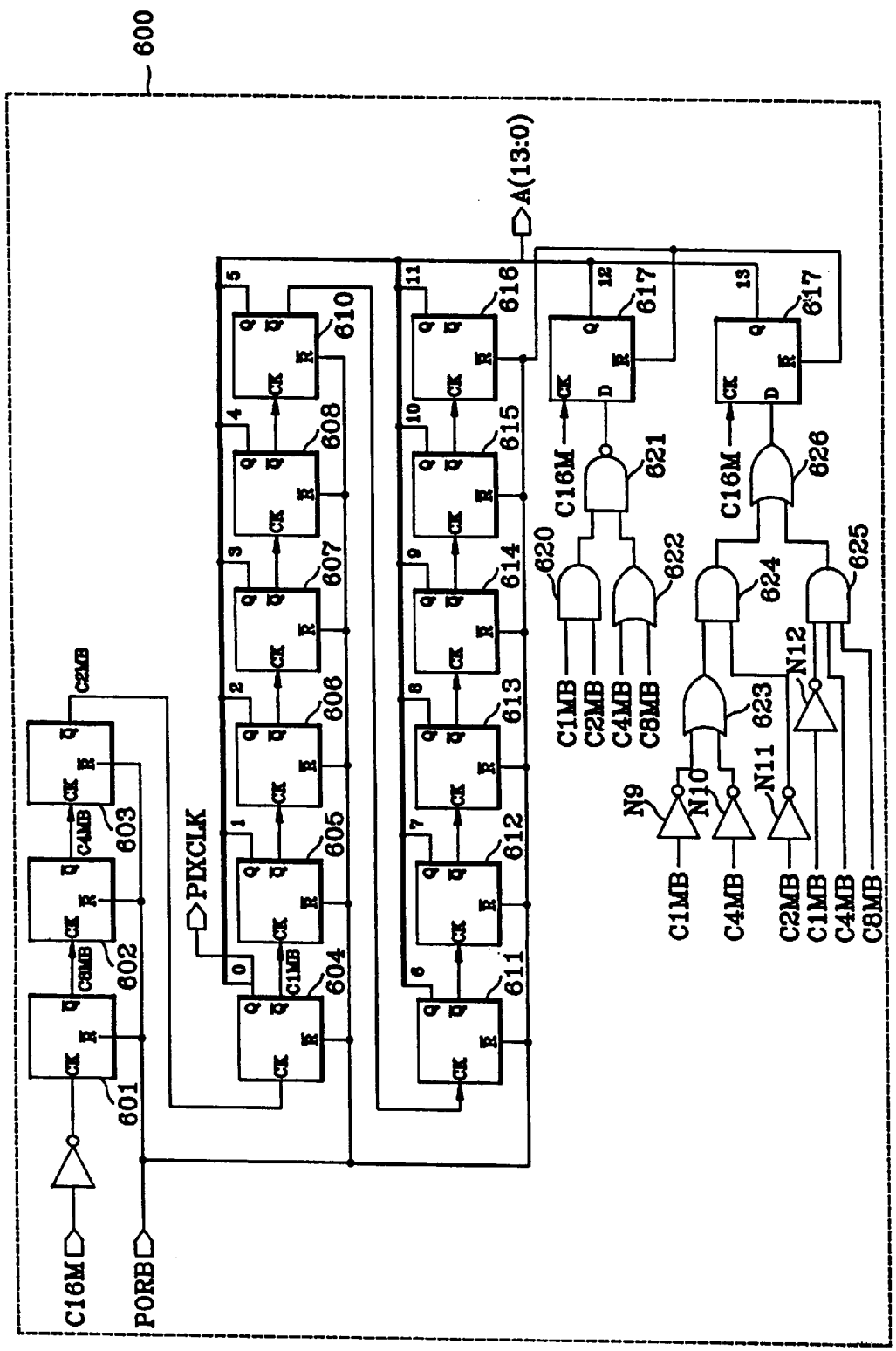
FIG. 6A illustrates an embodiment of an address generator of the main controller shown in FIG. 5.

The main controller 501 comprises an address generator and a first and second line memory read/write control signal generator. FIG. 6A illustrates an embodiment of the address generator 600. Specifically, the generator 600 comprises T flip-flops 601 to 615, D flip-flops 616 and 617, inverters N9 to N13, AND gates 620, 624, and 625, OR gates 622, 623, and 626, and a NAND gate 621.

The inverter N13 inputs the clock signal C16M and outputs an inverted clock signal C16M\. The T flip-flop 601 inputs the inverted clock signal C16M\, divides the frequency of the signal C16M\ by two, and outputs a clock signal C8MB having a frequency of approximately 8 Mhz. The T flip-flop 602 inputs the clock signal C8MB, divides the signal C8MB by two, and outputs a clock signal C4MB having a frequency of approximately 4 Mhz. The T flip-flop 603 inputs the clock signal C4MB, divides the signal C4MB by two, and outputs a clock signal C2MB having a frequency of approximately 2 Mhz. Similarly, the T flip-flop 604 inputs the clock signal C2MB, divides the signal C2MB by two, and outputs a clock signal C1MB having a frequency of approximately 1 Mhz.

As seen in FIG. 6A, the flip-flop 604 outputs the clock signal C1MB via its inverted output port and outputs the pixel clock PIXCLK via its non-inverted output port. Furthermore, the pixel clock PIXCLK constitutes the least significant bit A(0) of the address signal A(13:0). The T flip-flop 605 inputs the clock signal C1MB and outputs the bit A(1) of the signal A(13:0) via its non-inverted output port. The flip-flop 606 inputs the signal output from inverted output port of the flip-flop 605 and outputs the bit A(2) via its non-inverted output port. The remaining flip-flops 607 to 615 are similarly cascaded such that they respectively output bits A(3) to A(11) of the address signal A(13:0). Furthermore, the flip-flops 601 to 615 are reset by the power on reset signal PORB.

The AND gate 620 inputs the clock signals C1MB and C2MB, performs an AND operation on such signals, and outputs a first ANDed signal. The OR gate 622 inputs the clock signals C4MB and C8MB, performs an OR operation on such signals, and outputs a first ORed signal. The NAND gate inputs the first ANDed signal and the first ORed signal, performs a NAND operation on such signals, and outputs a first NANDed signal.

The inverters N9 to N12 input the clock signals C1MB, C4MB, C2MB, and C1MB and output first to fourth inverted signals, respectively. The OR gate 623 inputs the first and second inverted signals, performs an OR operation on such signals, and outputs a second ORed signal. The AND gate 624 inputs the second ORed signal and the third inverted signal, performs an AND operation on such signals, and outputs a second ANDed signal. The AND gate 625 inputs the fourth inverted signal and the clock signals C4MB and C8MB, performs an AND operation on such signals, and outputs a third ANDed signal. The OR gate 626 inputs the second and third ANDed signals, performs an OR operation on such signals, and outputs a third ORed signal.

The D flip-flop 616 inputs the first NANDed signal via its data port and the clock signal C16M via its clock port and outputs the bit A(12) of the address signal A(13:0). Similarly, the D flip-flop 617 inputs the third ORed signal via its data port and the clock signal C16M via its clock port and outputs the most significant bit A(13) of the signal A(13:0). Furthermore, the flip-flops 616 and 617 are reset by the reset signal PORB.

Figure 6B:
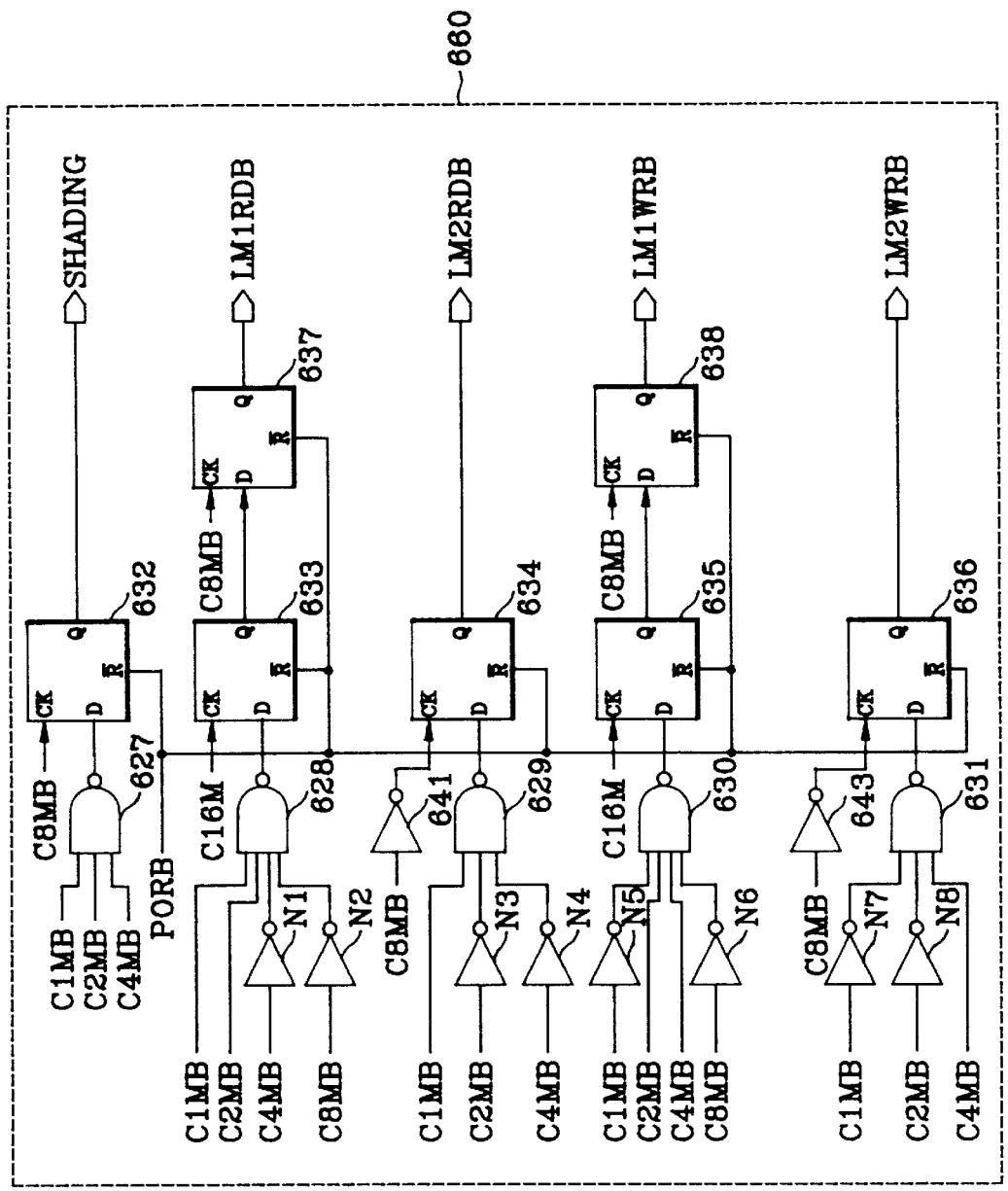
FIG. 6B illustrates an embodiment of a first and second line memory read/write control signal generator of the main controller shown in FIG. 5.

FIG. 6B illustrates an embodiment of the first and second line memory read/write control signal generator 660 of the main controller 501. As shown in the figure, the generator 660 comprises inverters N1 to N8, 641, and 643, NAND gates 627 to 631, and D flip-flops 632 to 638.

The inverters N1 to N8, 641, and 643 input the clock signals C4MB, C8MB, C2MB, C4MB, C1MB, C8MB, C1MB, C2MB, C8MB, and C8MB and output fifth to fourteenth inverted signals, respectively. The NAND gate 627 inputs the clock signals C1MB, C2MB, and C4MB, performs a NAND operation on such signals, and outputs a second NANDed signal. The NAND gate 628 inputs the clock signals C1MB and C2MB and the fifth and sixth inverted signals, performs a NAND operation on such signals, and outputs a third NANDed signal. The NAND gate 629 inputs the clock signal C1MB and the seventh and eighth inverted signals, performs a NAND operation on such signals, and outputs a fourth NANDed signal. The NAND gate 630 inputs the clock signals C2MB and C4MB and the ninth and tenth inverted signals, performs a NAND operation on such signals, and outputs a fifth NANDed signal. Finally, the NAND gate 631 inputs the clock signal C4MB and the eleventh and twelfth inverted signals, performs a NAND operation on such signals, and outputs a sixth NANDed signal.

The flip-flop 632 inputs the second NANDed signal via its data port and the clock signal C8MB via its clock port and outputs a shading signal SHADING. The flip-flop 633 inputs the third NANDed signal via its data port and the clock signal C16M via its clock port and outputs a first pre-control signal. The flip-flop 634 inputs the fourth NANDed signal via its data port and the thirteenth inverted signal via its clock port and outputs the second line memory read control signal LM2RDB. The flip-flop 635 inputs the fifth NANDed signal via its data port and the clock signal C16M via its clock port and outputs a second pre-control signal. The flip-flop 636 inputs the sixth NANDed signal via its data port and the fourteenth inverted signal via its clock port and outputs the second line memory write control signal LM2WRB. The flip-flop 637 inputs the first pre-control signal via its data port and the clock signal C8MB via its clock port and outputs the first line memory read control signal LM1RDB. Finally, the flip-flop 638 inputs the second pre-control signal via its data port and the clock signal C8MB via its clock port and outputs the first line memory write control signal LM1WRB. Moreover, the flip-flops 632 to 638 are reset by the reset signal PORB.

Figure 7:
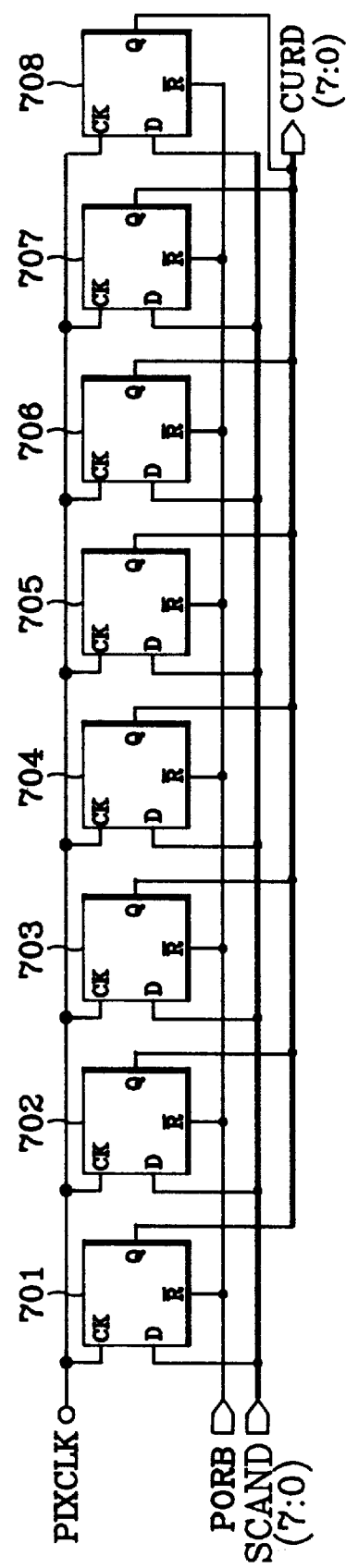
FIG. 7 illustrates an embodiment of a register shown in FIG. 5.

An illustrative embodiment of the structure of the register 502a is shown in FIG. 7. In particular, the register 502a comprises D flop-flops 701 to 708 which respectively input the bits SCAND(7) to SCAND(0) of the pixel data SCAND (7:0) and which respectively output the bits CURD(7) to CURD(0) of the current data CURD(7:0) in accordance with the pixel clock PIXCLK. Furthermore, the flip-flops 701 to 708 are reset by the reset signal PORB. In addition, the structure of the registers 502b and 502c is similar to the structure of the register 502a and thus, will not be described.

Figure 8A:
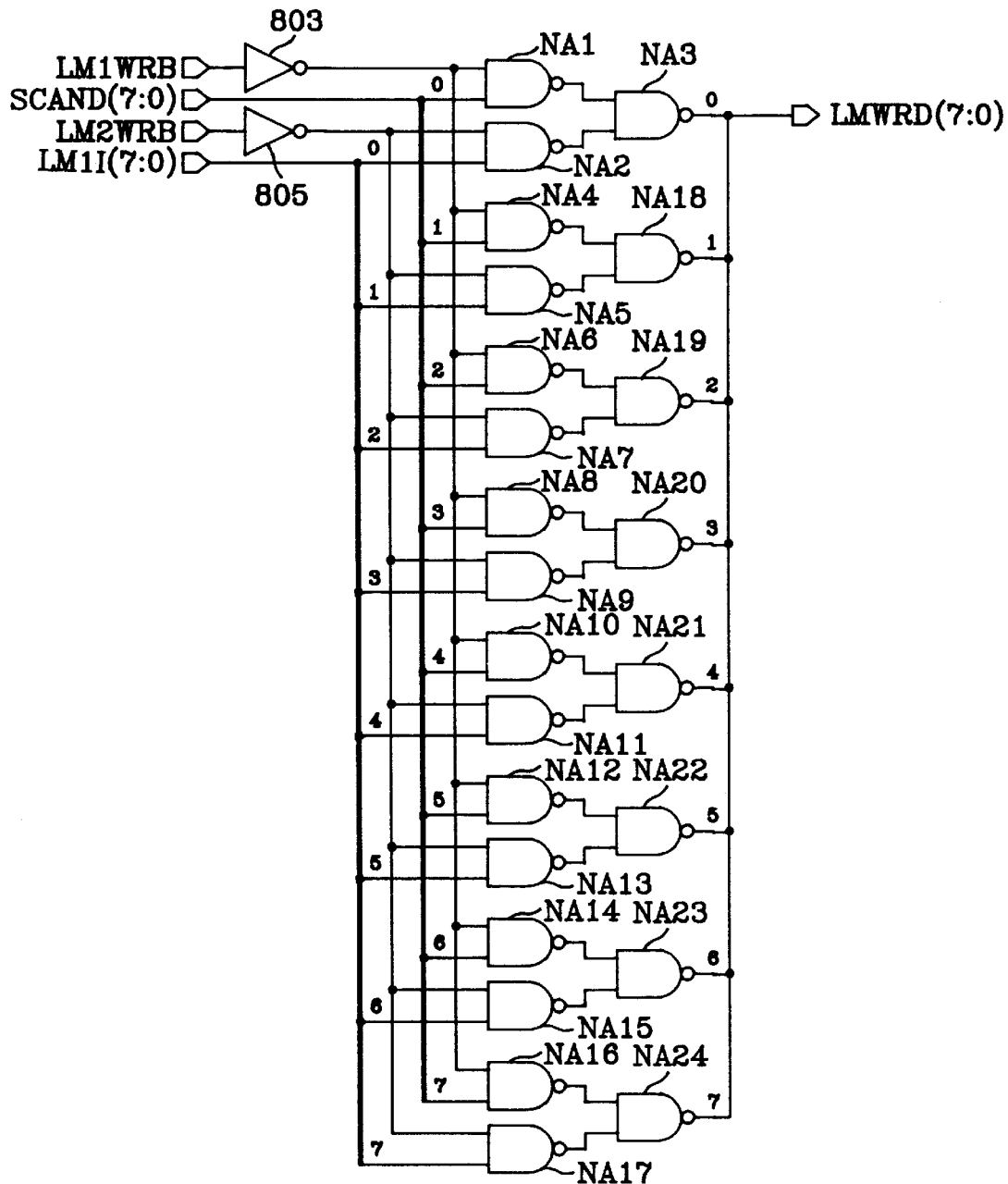
FIG. 8A illustrates an embodiment of a data selection circuit of the multiplexer shown in FIG. 5.

The multiplexer 503 in FIG. 5 comprises a data selection circuit and a write control signal generator. FIG. 8A shows an example of the data selection circuit. Specifically, the circuit comprises inverters 803 and 805 and NAND gates NA1 to NA24. The inverter 803 inputs the first line memory write control signal LM1WRB and outputs a fifteenth inverted signal, and the inverter 805 inputs the second line memory write control signal LM2WRB and outputs a sixteenth inverted signal.

The NAND gate NA1 inputs the fifteenth inverted signal and the bit SCAND(0) of the pixel data SCAND(7:0), performs an NAND operation on such signals, and outputs a seventh NANDed signal. The NAND gate NA2 inputs the sixteenth inverted signal and the bit LM1I(0) of the first line memory data LM1I(7:0), performs an NAND operation on such signals, and outputs an eighth NANDed signal. Then, the NAND gate NA3 inputs the seventh and eighth NANDed signals, performs a NAND operation on such signals, and outputs a bit LMWRD(0) of the line memory write data LMWRD(7:0).

As shown in FIG. 8A, the NAND gates NA1, NA2, and NA3 designate a first sub-selection circuit which inputs the bits SCAND(0) and LM1I(0) and which selectively outputs one of the bits SCAND(0) or LM1I(0) as a selected bit LMWRD(0) based on the values of the write control signals LM1WRB and LM2WRB. Moreover, the remaining NAND gates NA4 to NA24 operate in a similar manner. Specifically, the NAND gates NA4, NA5, and NA18 designate a second sub-selection circuit which inputs the bits SCAND(1) and LM1I(1) and which outputs one of the bits SCAND(1) or LM1I(1) as a selected bit LMWRD(1) based on the values of the signals LM1WRB and LM2WRB. Similarly, the NAND gates NA6, NA7, and NA19 designate a third sub-selection circuit which inputs the bits SCAND(2) and LM1I(2) and which outputs a selected bit LMWRD(2). The NAND gates NA8, NA9, and NA20 designate a fourth sub-selection circuit which inputs the bits SCAND(3) and LM1I(3) and which outputs a selected bit LMWRD(3). The NAND gates NA10, NA11, and NA21 designate a fifth sub-selection circuit which inputs the bits SCAND(4) and LM1I(4) and which outputs a selected bit LMWRD(4). The NAND gates NA12, NA13, and NA22 designate a sixth sub-selection circuit which inputs the bits SCAND(5) and LM1I(5) and which outputs a selected bit LMWRD(5). The NAND gates NA14, NA15, and NA23 designate a seventh sub-selection circuit which inputs the bits SCAND(6) and LM1I(6) and which outputs a selected bit LMWRD(6). Finally, the NAND gates NA16, NA17, and NA24 designate an eighth subselection circuit which inputs the bits SCAND (7) and LM1I(7) and which outputs a selected bit LMWRD (7). Based on the configuration above, the data selection circuit of FIG. 8A inputs the pixel data SCAND(7:0) and the first line memory data LM1I(7:0) to be written in the first and second line memories and selectively outputs the data SCAND(7:0) or LM1I(7:0) at the appropriate time.

Figure 8B:
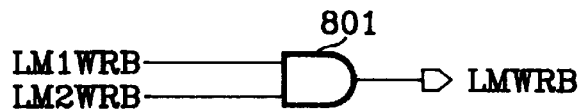
FIG. 8B illustrates an embodiment of a write control signal generator of the multiplexer shown in FIG. 5.

FIG. 8B shows and example of the write control signal generator of the multiplexer 501. In particular, the generator contains an AND gate 801 which inputs the first and second line memory write control signals LM1WRB and LM2WRB, performs an AND operation on such signals LM1WRB and LM2WRB, and outputs the selected line memory write control signal LMWRB. Based on the configuration above, the write control signal generator of FIG. 8B outputs a selected write control signal LMWRB to synchronize when the data SCAND(7:0) or LM1I(7:0) is to be written into the first or second line memory of the RAM 506.

Figure 9:
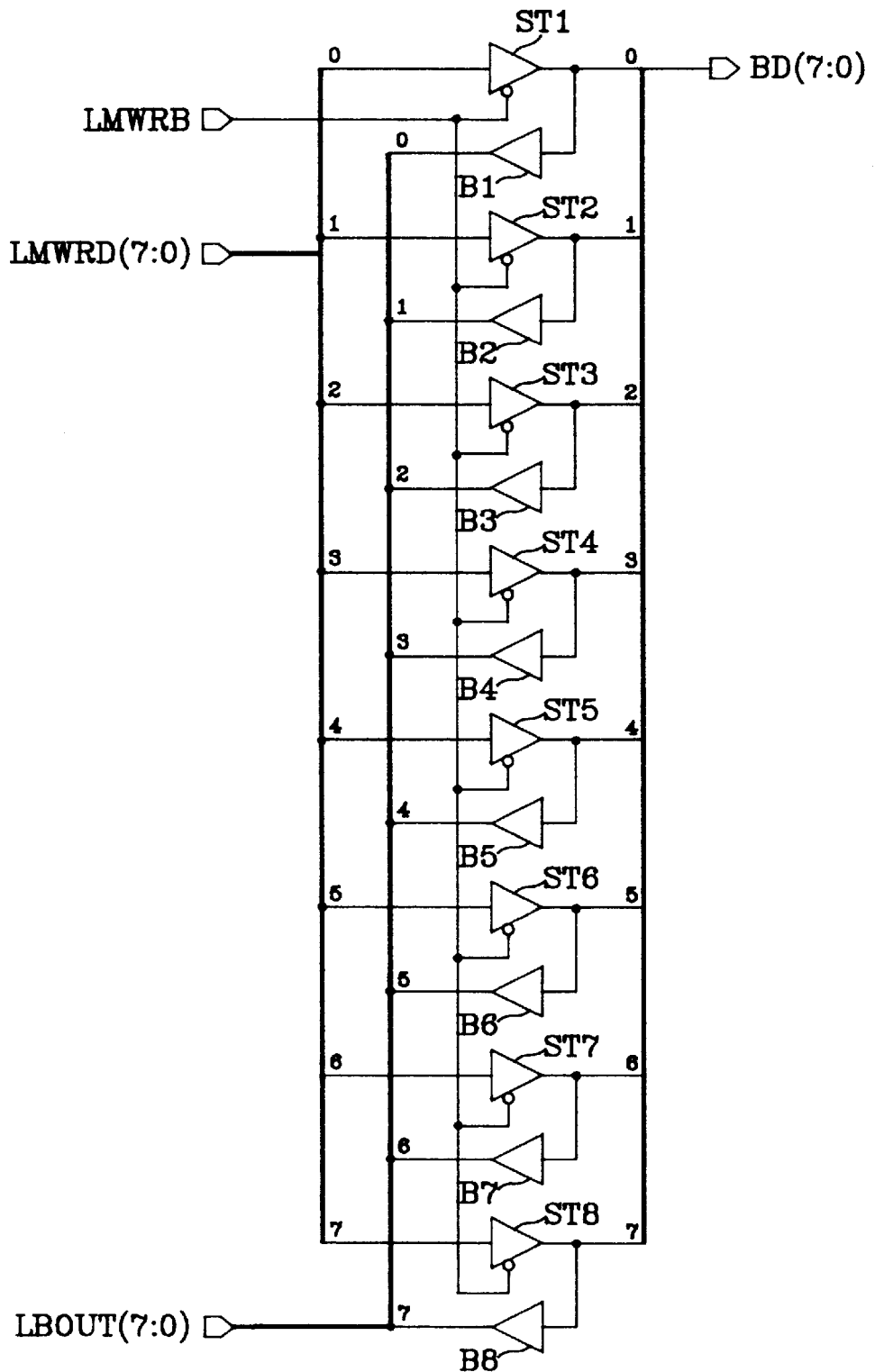
FIG. 9 illustrates an embodiment of the data transmission direction selector shown in FIG. 5.

An example of configuration of the data transmission direction selector 504 is shown in FIG. 9. In particular, the selector 504 comprises tri-state buffers ST1 to ST8 and buffers B1 to B8. The data input ports of the tri-state buffers ST1 to ST8 respectively input the bits LMWRD(0) to LMWRD(7) of the line memory write data LMWRD(7:0) output from the multiplexer 503, and the enable ports of the buffers ST1 to ST8 input the selected line memory write control signal LMWRB. Accordingly, when the signal LMWRB has a first value (e.g. "0"), the buffers ST1–ST8 are temporarily open, and the data LMWRD(7:0) to be written to the first or second line memories is output as the RAM data BD(7:0). Moreover, the data LMWRD(7:0) is respectively output via the buffers B1 to B8 as the line memory data LBOUT(7:0). On the other hand, when the signal LMWRB has a second value (e.g. "1"), the buffers ST1 to ST8 are closed. As a result, the RAM data BD(7:0) read from the RAM 305 may be respectively output via the buffers B1 to B8 as the line memory data LBOUT(7:0) and supplied to the registers 502b and 502c.

As described above, the buffers B1 to B8 are not tri-state buffers. However, they could be replaced with tri-state buffers which are open (or closed) when the buffers ST1 to ST8 are closed (or open). Furthermore, such replacement tri-state buffers could be open when the write control signal LMWRB equals a second value (e.g. "1") or when the read control signal RDB equals a first value (e.g. "0").

Figure 10:
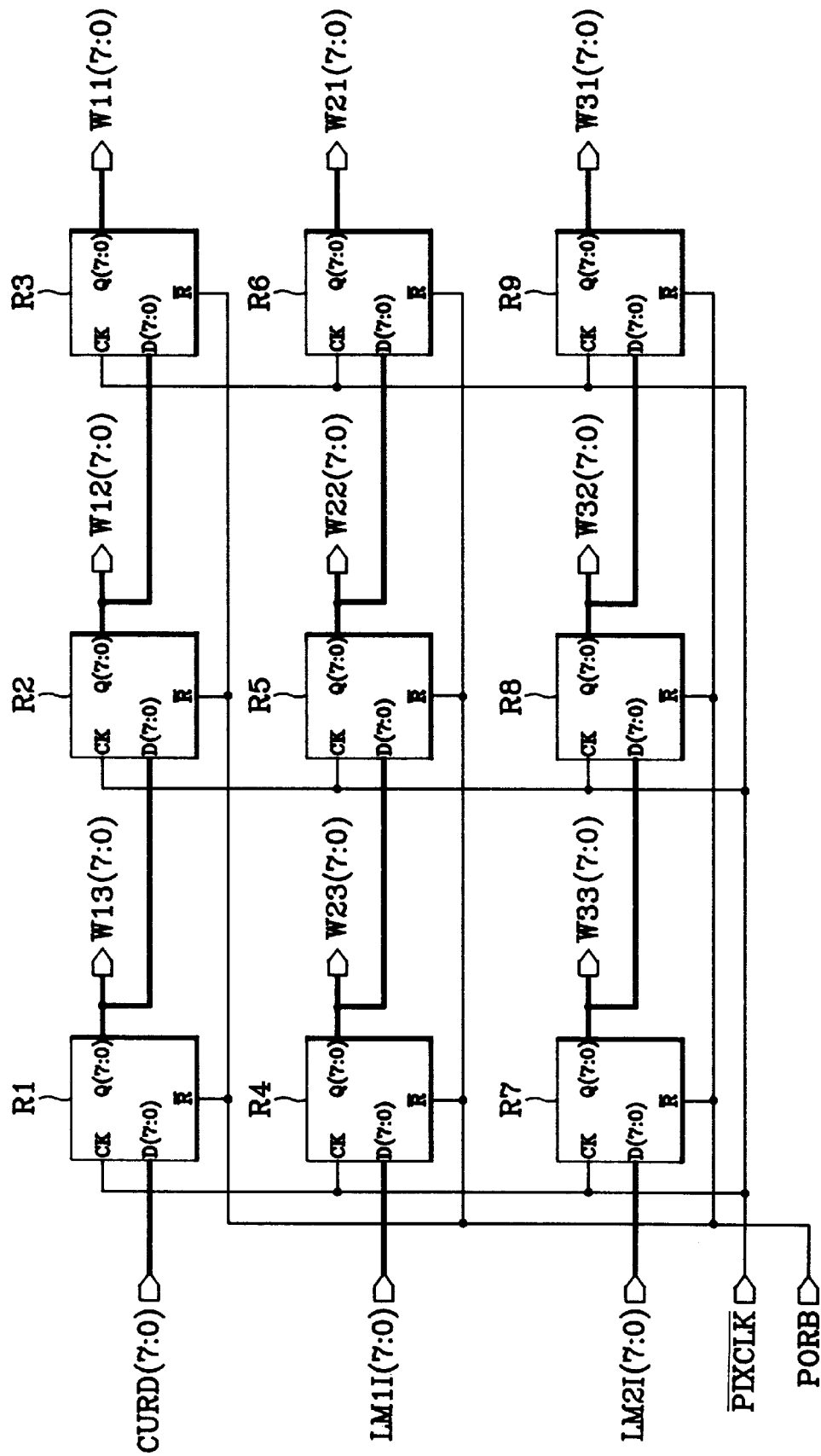
FIG. 10 illustrates an embodiment of the window generator shown in FIG. 5.

An more detailed embodiment of the window generator 505 shown in FIG. 5 is illustrated in FIG. 10. Specifically, the generator 505 comprises a plurality of registers R1 to R9. The register R1 inputs the current data CURD(7:0) from the register 502a, the register R4 inputs the first line memory data LM1I(7:0) from the register 502b, and the register R7 inputs the second line memory data LM2I(7:0) from the register 502c. Furthermore, the registers R1, R4, and R7 input the inverted pixel clock PIXCLK\ and respectively output the line window signals W13(7:0), W23(7:0), and W33(7:0). The registers R2, R5, and R8 respectively input the signals W13(7:0), W23(7:0), and W33(7:0) via their data ports, input the inverted pixel clock PIXCLK\ via their clock ports, and output the line window signals W12(7:0), W22 (7:0), and W32(7:0). Similarly, the registers R3, R6, and R9 respectively input the signals W12(7:0), W22(7:0), and W32(7:0) via their data ports, input the inverted pixel clock PIXCLK\ via their clock ports, and output the line window signals W11(7:0), W21(7:0), and W31(7:0). Furthermore, all of the registers R1 to R9 are reset by the power on reset signal PORB.

Figure 11:
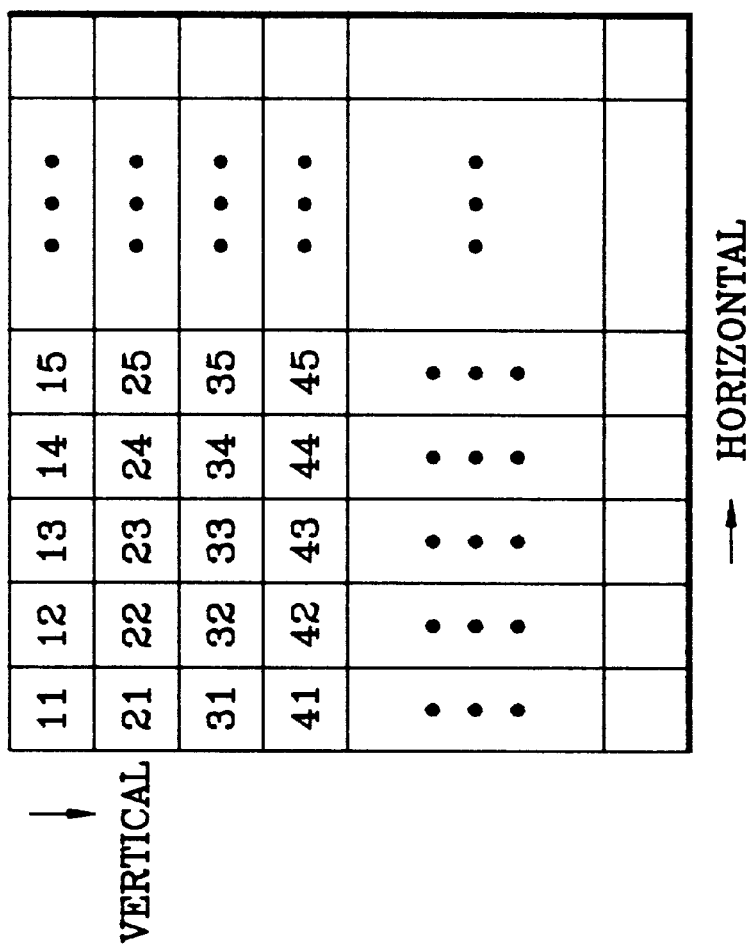
FIG. 11 illustrates an embodiment of the pixel data input to the processing system shown in FIG. 5.

FIG. 11 is a diagram of the pixel data SCAND(7:0) of an image which is input to the processing system illustrated in FIG. 5. In the figure, the numerical values associated with the data correspond to the locations of the pixels to which the data correspond. For example, the value "12" corresponds to the pixel data located in the first row and second column of the image.

Figure 12:
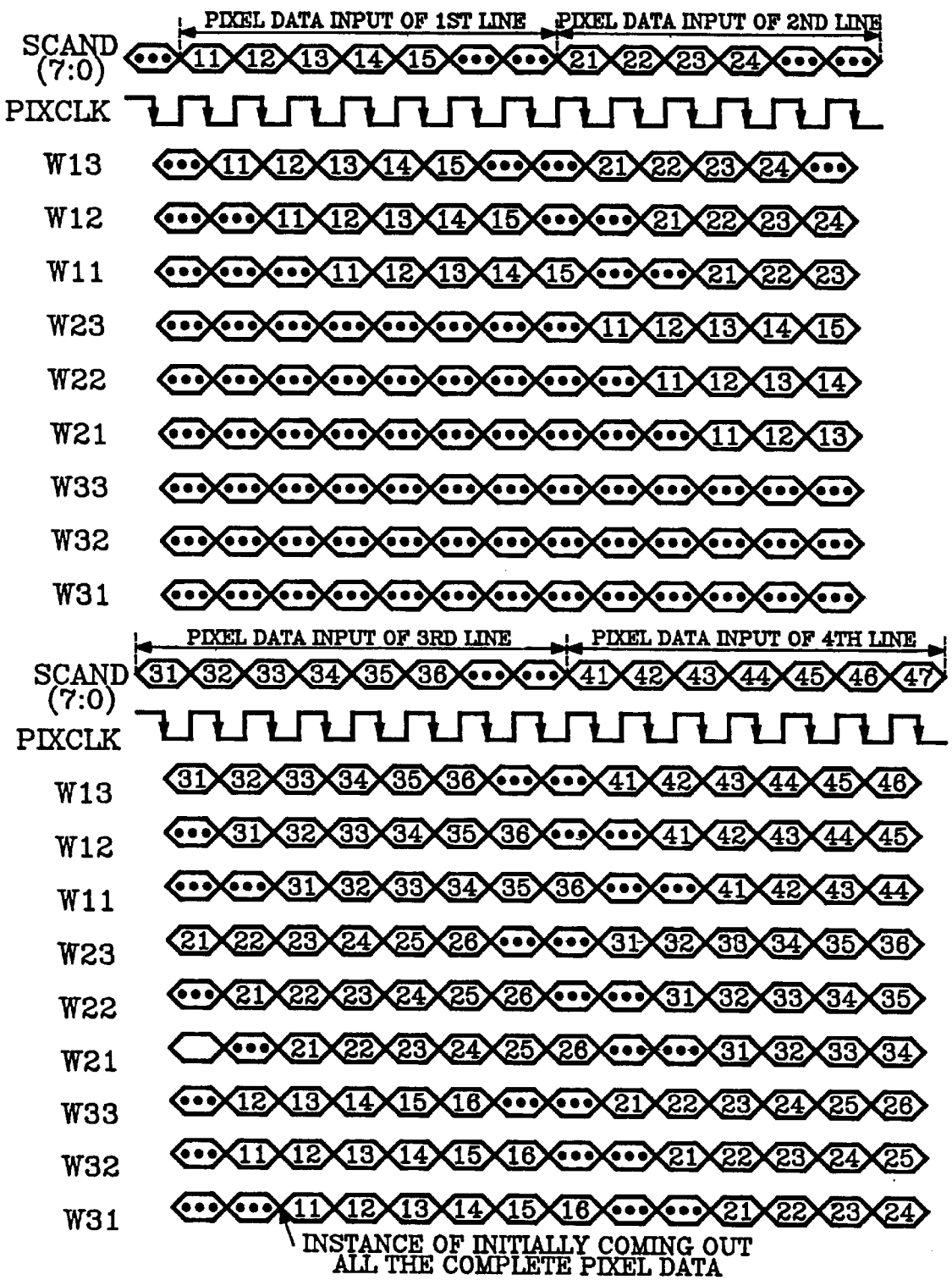
FIG. 12 illustrates an embodiment of n×n window resulting from processing the first to the fourth lines pixel data shown in FIG. 11.

FIG. 12 shows an example of how the pixel data SCAND (7:0) is input to and processed by window generator 505. Specifically, when the first row of the pixel data SCAND (7:0) is being scanned, the data 11, 12, 13, 14, 15, etc., sequentially cascade through the registers R1, R2, and R3 of the window generator 505. Then, when the second row of pixel data SCAND(7:0) is being scanned, the data 21, 22, 23, 24, 25, etc., sequentially cascade through the registers R1, R2, and R3. Furthermore, the first row of pixel data SCAND (7:0) (i.e. the first line memory data LM1I (7:0)) 11, 12, 13, 14, 15, etc., sequentially cascade through the registers R4, R5, and R6. Subsequently, when the third row of pixel data SCAND(7:0) is being scanned, the data 31, 32, 33, 34, 35, etc., sequentially cascade through the registers R1, R2, and R3, the second row of pixel data SCAND(7:0) (i.e. the first line memory data LM1I (7:0)) 21, 22, 23, 24, 25, etc., sequentially cascade through the registers R4, R5, and R6, and the first row of pixel data SCAND(7:0) (i.e. the second line memory data LM2I(7:0)) 11, 12, 13, 14, 15, etc., sequentially cascade through the registers R7, R8, and R9. Accordingly, when the data 33 of the third row of pixel data SCAND(7:0) is latched into the register R1, the window signals W13, W12, and W11 respectively represent the data 33, 32, 31 (i.e. the current row of data SCAND(7:0)), the signals W23, W22, and W21 respectively represent the data 23, 22, and 21 (i.e. the previous row of data SCAND(7:0)), and the signals W33, W32, and W31 respectively represent the data 13, 12, and 11 (i.e. the row of data before the previous row of data SCAND(7:0)).

Figure 13:
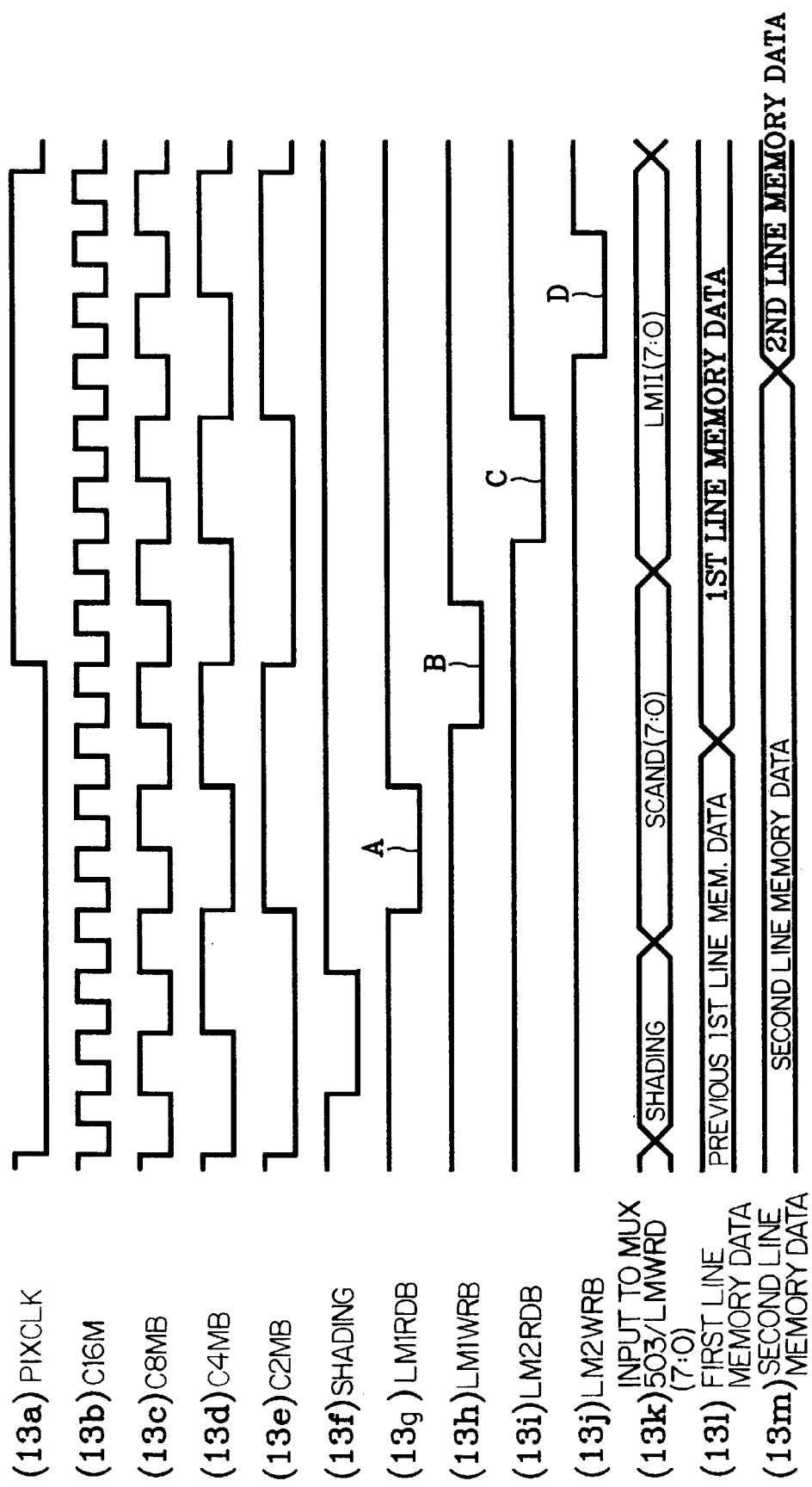
FIG. 13 illustrates an embodiment of a timing diagram for controlling the RAM shown in FIG. 5.

FIG. 13 illustrates a timing diagram of various signals input to, output from, or stored in the RAM 305. FIG. 13(a) shows the timing of the pixel clock PIXCLK used by the register 502a to latch data in the first register 502a and the registers R1 to R9 of the window generator 505. FIGS. 13(b) to (e) represent the clock signals C16M, C8MB, C4MB, and C2MB which are used by the main controller 501 to generate the address signal A(13:0), the first and second read control signals LM1RDB and LM2RDB, and the first and second write control signals LM1WRB and LM2WRB. Futhermore, FIG. 13(f) illustrates the timing of the signal SHADING output by the control signal generator 660 of the main controller 501.

FIGS. 13(g) and (h) show examples of the timing diagrams of the first line memory read and write control signals LM1RDB and LM1WRB, respectively. Similarly, FIGS. 13(i) and (j) show examples of the timing diagrams of the second line memory read and write control signals LM2RDB and LM2WRB, respectively.

FIGS. 13(k) to (m) illustrate various data written to, read from, or stored in the RAM 506. Specifically, FIG. 13(k) represents the value of data input to the multiplexer 503 and subsequently output as the line memory write data LMWRD (7:0) which is written to the first or second line memory of the RAM 506. FIG. 13(l) corresponds to the data stored in the first line memory of the RAM 506, and FIG. 13(m) represents the data stored in the second line memory of the RAM 506.

An example of how data is written to, read from, and stored in the RAM 506 will be described below. First, pixel data SCAND(7:0) relating to a pixel of the currently scanned line is output to the first register 502a and the multiplexer 503. Then, when a low pulse A (FIG. 13(g)) of the first line memory read control signal LM1RDB occurs, the read control signal RDB output from the AND gate 507 becomes low, and the previous first line memory data (FIG. 13(l)) is output from the first line memory of the RAM 506 as the RAM data BD(7:0). The data BD(7:0) is output to the data transmission selector 504 which outputs such data BD(7:0) as the line memory data LBOUT(7:0) via the buffers B1 to B8. Subsequently, when the low pulse A (FIG. 13(g)) becomes high, the line memory data LBOUT(7:0) (i.e. the previous first line memory data (FIG. 13(l)) is latched in the second register 502b.

Subsequently, when a low pulse B (FIG. 13(h)) of the first line memory write control signal LM1WRB occurs, the data SCAND(7:0) which is input to the multiplexer 503 is output as the line memory write data LMWRD(7:0). Furthermore, when the low pulse B of the signal LM1WRB occurs, the selected line memory write control signal LMWRB output from the AND gate 801 of the multiplexer 503 becomes low.

When the signal LMWRB is low, the tri-state buffers ST1 to ST8 are open, and thus, the line memory write data LMWRD(7:0) is output to the RAM 506 as the RAM data BD(7:0) via the buffers ST1 to ST8. Furthermore, the low pulse B of the first line memory write control signal LM1WRB causes the RAM data BD(7:0) (i.e. the data SCAND(7:0)) to be written in the first line memory of the RAM 506 as the first line memory data (FIG. 13(l)).

Then, when a low pulse C (FIG. 13(i)) of the second line memory read control signal LM2RDB occurs, the read control signal RDB output from the AND gate 507 becomes low, and the previous second line memory data (FIG. 13(m)) is output from the second line memory of the RAM 506 as the RAM data BD(7:0). The data BD(7:0) is output to the data transmission selector 504 which outputs such data BD(7:0) as the line memory data LBOUT(7:0) via the buffers B1 to B8. Subsequently, when the low pulse C (FIG. 13(i)) becomes high, the line memory data LBOUT(7:0) (i.e. the previous second line memory data (FIG. 13(m)) is latched in the third register 502c.

Then, when a low pulse D (FIG. 13(j)) of the second line memory write control signal LM2WRB occurs, the first line memory data LM1I(7:0) is output from the register 502b and is input to the multiplexer 503. Afterwards, the multiplexer 503 outputs the data LM1I(7:0) as the line memory write data LMWRD(7:0). Also, when the low pulse D of the signal LM1WRB occurs, the selected line memory write control signal LMWRB output from the AND gate 801 becomes low.

When the signal LMWRB is low, the tri-state buffers ST1 to ST8 are open, and thus, the line memory write data LMWRD(7:0) is output to the RAM 506 as the RAM data BD(7:0) via the buffers ST1 to ST8. Furthermore, the low pulse D of the second line memory write control signal LM2WRB causes the RAM data BD(7:0) (i.e. the first line memory data LM1I(7:0)) to be written in the second line memory of the RAM 506 as the second line memory data (FIG. 13(m)).

Figure 14:
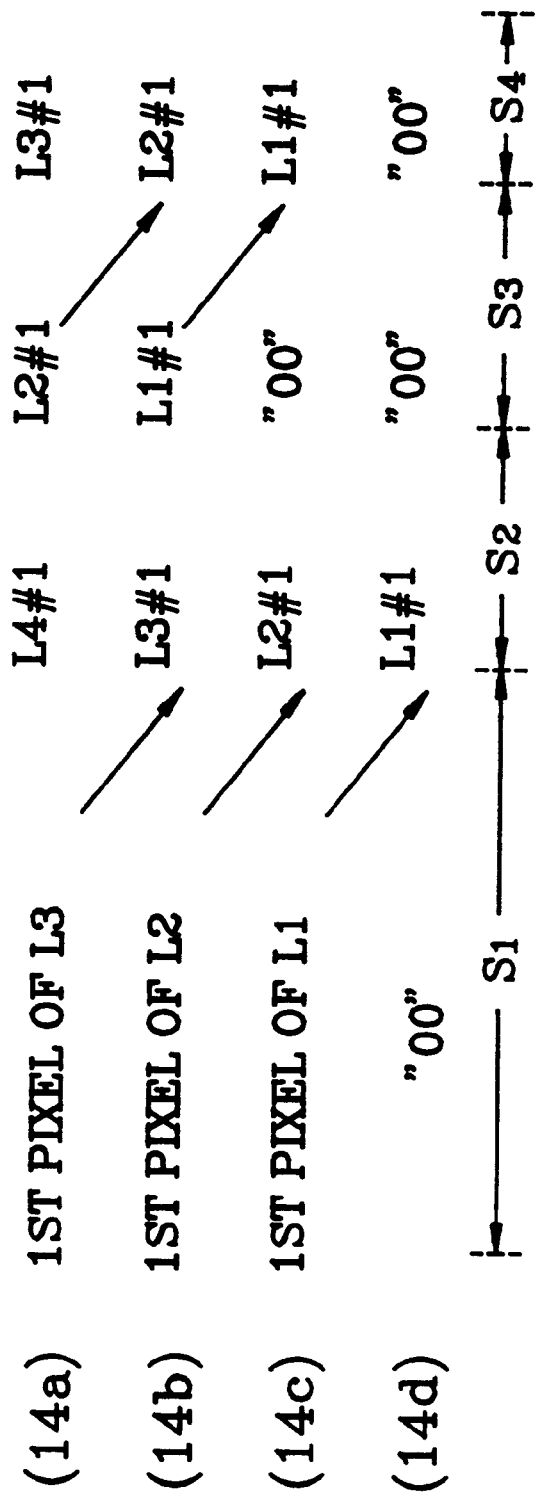
FIG. 14 illustrates a diagram of an opening window of the first pixel data between the first and second line memories according to an embodiment of the present invention.

FIG. 14 is a view showing an example of opening window of the first pixel data between the first and second line memories according to the embodiment of the present invention.

The value A read in the first line memory is written in the first line memory as passing from the first step S1 to the next step S2, read in the second line memory in step S3 and written in the second line memory in the last step S4. An example thereof is illustrated in 14b of FIG. 14. As shown in FIG. 14, when the first pixel value of the 3×3 window is obtained from the line memory, the first and second memory and the current scan pixel open a window after horizontal movement of three times.

In the embodiment described above, the current line of pixel data is immediately processed, and the previous two lines of pixel data are respectively stored in first and second line memories implemented by hardware buffers of a RAM. Since only two line memories are required, the amount of hardware needed to implement the device is significantly reduced. Furthermore, since the pixel data is processed via hardware instead of software, the processing speed of the embodiment is drastically increased. Accordingly, the present invention is capable of efficiently generating a two-dimensional window for enhancing the edges of an image as well as for various other image processing methods such as error diffusion and wave form dithering. In other words, the pixel values of the data relating to the previous two lines of pixels are sequentially stored in the RAM, and the stored pixel values can be efficiently manipulated and managed to calculate the value of the data corresponding to the current pixel.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed is:

1. A window generating circuit of an image processing apparatus which processes an image, comprising:
    a main controller which inputs an original clock signal and generates a first line memory read control signal, a second line memory read control signal, a first line memory write control signal, a second line memory write control signal, a pixel clock, and address signals for first and second line memories based on said original clock signal;
    a memory device which comprises said first line memory and said second line memory;
    a first register which stores current pixel data in accordance with said pixel clock, wherein said current pixel data relates to a current line of pixels of said image;
    a second register which stores first line memory data that is output from said first line memory in accordance with said first line memory read control signal, wherein said first line memory data relates to a first line of pixels which precedes said current line of pixels;
    a third register which stores second line memory data that is output from said second line memory in accordance with said second line memory read control signal, wherein said second line memory data relates to a second line of pixels which precedes said first line of pixels; and
    a window generator which inputs said current pixel data from said first register, said first line memory data from said second register, and said second line memory data from said third register and which generates an n×n window of data based on said current pixel data, said first line memory data, and said second line memory data, wherein said n×n window of data is generated in synchronicity with said pixel clock and wherein n is a positive integer greater than two.

2. A window generating circuit as claimed in claim 1, further comprising:
    a multiplexer which inputs first initial data, second initial data, said first line memory write control signal, and said second line memory write control signal,
        wherein said multiplexer generates a selected memory write control signal based on said first line memory write control signal and said second line memory write control signal,
        wherein said multiplexer selectively outputs said first initial data as selected data to be stored in said first line memory as said first line memory data based on said selected memory write control signal, and
        wherein said multiplexer selectively outputs said second initial data as said selected data to be stored in said second line memory as said second line memory data based on said selected memory write control signal.

3. A window generating circuit as claimed in claim 2, wherein said first initial data is said current pixel data and said second initial data is said first line memory data output from said second register.

4. A window generating circuit as claimed in claim 2, further comprising:
    a data transmission direction selector which selectively establishes a first data path from said multiplexer to said memory device so that said selected data can be stored in at least one of said first line memory and said second line memory and which selectively establishes a second data path from said memory device to at least one of said second register and said third register so that at least one of said first line memory data can be output to said second register and said second line memory data can be output to said third register,
    wherein said data transmission direction selector selectively establishes said first data path and said second data path based on at least said selected memory write control signal.

5. A window generating circuit as claimed in claim 2, further comprising:
    a gate circuit which inputs said first line memory read control signal and said second line memory read control signal and which generates a resultant read control signal for reading at least one of said first line memory data and said second line memory data from said first line memory and said second line memory, respectively.

6. The window generating circuit as claimed in claim 1, wherein said main controller comprises:
    an address generator which inputs said original clock signal, frequency divides said original clock signal to produce at least one divided clock, and generates said address signals based on said original clock signal and said at least one divided clock.

7. The window generating circuit as claimed in claim 6, wherein said main controller comprises:
    a first and second line memory read/write control signal generator which inputs said original clock signal and said at least one divided clock and generates said first line memory read control signal, said second line memory read control signal, said first line memory write control signal, and said second line memory write control signal.

8. The window generating circuit as claimed in claim 7, wherein said at least one divided clock comprises:
    a first divided clock which has a first frequency less than an original frequency of said original clock signal;
    a second divided clock which has a second frequency less than said first frequency;

a third divided clock which has a third frequency less than said second frequency; and a fourth divided clock which has a fourth frequency less than said third frequency.

9. The window generating circuit as claimed in claim 8, wherein said first frequency is one half said original frequency, said second frequency is one fourth said original frequency, said third frequency is one eighth said original frequency, and said fourth frequency is one sixteenth said original frequency.

10. The window generating circuit as claimed in claim 1, wherein at least one of said first, second, and third registers comprises a plurality of flip-flops having an input bus and an output bus, wherein said plurality of flip-flops latch input data from said input data bus and output said input data as output data on said output data bus.

11. The window generating circuit as claimed in claim 4, wherein said multiplexer comprises a gate circuit which inputs said first and second line memory write control signals, performs an AND operation on said first and second line memory write control signals, and outputs said selected memory write control signal to said data transmission direction selector.

12. The window generating circuit as claimed in claim 1, wherein said window generator comprises:

a first row of n window registers which are cascaded and sequentially input said current pixel data from said first register and which output a first data row of said n×n window of data;

a second row of n window registers which are cascaded and sequentially input said first line memory data from said second register and which output a second data row of said n×n window of data; and a third row of n window registers which are cascaded and sequentially input said second line memory data from said third register and which output a third data row of said n×n window of data.

13. The window generating circuit as claimed in claim 3, wherein said window generator comprises:

a first row of n window registers which are cascaded and sequentially input said current pixel data from said first register and which output a first data row of said n×n window of data;

a second row of n window registers which are cascaded and sequentially input said first line memory data from said second register and which output a second data row of said n×n window of data; and a third row of n window registers which are cascaded and sequentially input said second line memory data from said third register and which output a third data row of said n×n window of data.

14. A window generating circuit as claimed in claim 13, further comprising:

a data transmission direction selector which selectively establishes a first data path from said multiplexer to said memory device so that said selected data can be stored in at least one of said first line memory and said second line memory and which selectively establishes a second data path from said memory device to at least one of said second register and said third register so that at least one of said first line memory data can be output to said second register and said second line memory data can be output to said third register, wherein said data transmission direction selector selectively establishes said first data path and said second data path based on at least said selected memory write control signal.

15. The window generating circuit as claimed in claim 14, wherein said main controller comprises:

an address generator which inputs said original clock signal, wherein said address generator frequency divides said original clock signal to produce a first divided clock which has a first frequency less than an original frequency of said original clock signal, a second divided clock which has a second frequency less than said first frequency, a third divided clock which has a third frequency less than said second frequency, a fourth divided clock which has a fourth frequency less than said third frequency, and wherein said address generator generates said address signals based on said original clock signal, said first divided clock, said second divided clock, said third divided clock, and said fourth divided clock.

16. The window generating circuit as claimed in claim 15, wherein said main controller comprises:

a first and second line memory read/write control signal generator which inputs said original clock signal, said first divided clock, said second divided clock, said third divided clock, and said fourth divided clock and generates said first line memory read control signal, said second line memory read control signal, said first line memory write control signal, and said second line memory write control signal.

17. A window generating method for efficiently managing pixel data to generate an n×n window of data to calculate a data value of a current pixel of an image, comprising the steps of:

(a) inputting current pixel data relating to a current line of pixels of said image, first line memory data relating to a first line of pixels preceding said current line of pixels, and second line memory data relating to a second line of pixels preceding said first line of pixels;

(b) sequentially storing said second line memory data in a second line memory of a memory device and said first line memory data in a first line memory of said memory device;

(c) inputting an original clock signal;

(d) generating a pixel clock based on said original clock signal; and (e) processing said current pixel data, said first line memory data, and said second line memory data in accordance with said pixel clock and generating said n×n window of data, wherein n is a positive integer greater than two.

18. The window generating method as claimed in claim 17, wherein said step (d) comprises the steps of:

(d1) generating said pixel clock, a first line memory read control signal, and a second line memory read control signal based on said original clock signal.

19. The window generating method as claimed in claim 18, wherein said step (e) comprises the steps of:

(e1) inputting said current pixel data to a first register based on said pixel clock;

(e2) reading said first line memory data from said first line memory and storing said first line memory data in a second register based on said first line memory read control signal;

(e3) reading said second line memory data from said second line memory and storing said second line memory data in a third register based on said second line memory read control signal; and (e4) inputting said current pixel data, said first line memory data, and said second line memory data from said first, second, and third registers, respectively, and processing said current pixel data, said first line memory data, and said second line memory data to produce said n×n window of data.

20. The window generating method as claimed in claim 19, wherein said step (e4) comprises the steps of:
(e4a) sequentially inputting said current pixel data from said first register to a first row of n window registers based on said pixel clock, wherein said first row of n window registers are cascaded together and output a first data row of said n×n window of data;
(e4b) sequentially inputting said first line memory data from said second register to a second row of n window registers based on said pixel clock, wherein said second row of n window registers are cascaded together and output a second data row of said n×n window of data; and
(e4b) sequentially inputting said second line memory data from said third register to a third row of n window registers based on said pixel clock, wherein said third row of n window registers are cascaded together and output a third data row of said n×n window of data.

21. The window generating method as claimed in claim 17, wherein said step (d) comprises the step of:
(d1) generating said pixel clock, a first line memory write control signal, a second line memory write control signal, and address signals based on said original clock signal.

22. The window generating method as claimed in claim 21, wherein said step (b) comprises the steps of:
(b1) storing said second line memory data in said second line memory at a first address defined by said address signals and in accordance with said second line memory write control signal; and
(b2) storing said first line memory data in said first line memory at a second address defined by said address signals and in accordance with said first line memory write control signal.

23. The window generating method as claimed in claim 22,
wherein said step (b1) comprises the steps of:
(b1a) inputting previous first line memory data to a multiplexer;
(b1b) selectively outputting said previous first line memory data from said multiplexer as said second line memory data based on said second line memory write control signal; and
(b1c) storing said second line memory data in said second line memory, and
wherein said step (b2) comprises the steps of:
(b2a) inputting previous current pixel data to said multiplexer;
(b2b) selectively outputting said previous current pixel data from said multiplexer as said first line memory data based on said first line memory write control signal; and
(b2c) storing said first line memory data in said first line memory.

24. The window generating method as claimed in claim 20, wherein said step (d) comprises the step of:
(d2) generating a first line memory write control signal, a second line memory write control signal, and address signals based on said original clock signal.

25. The window generating method as claimed in claim 24, wherein said step (b) comprises the steps of:
(b1) storing said second line memory data in said second line memory at a first address defined by said address signals and in accordance with said second line memory write control signal; and
(b2) storing said first line memory data in said first line memory at a second address defined by said address signals and in accordance with said first line memory write control signal.

26. The window generating method as claimed in claim 25,
wherein said step (b1) comprises the steps of:
(b1a) inputting previous first line memory data from said second register to a multiplexer;
(b1b) selectively outputting said previous first line memory data from said multiplexer as said second line memory data based on said second line memory write control signal; and
(b1c) storing said second line memory data in said second line memory, and
wherein said step (b2) comprises the steps of:
(b2a) inputting previous current pixel data from said first register to said multiplexer;
(b2b) selectively outputting said previous current pixel data from said multiplexer as said first line memory data based on said first line memory write control signal; and
(b2c) storing said first line memory data in said first line memory.

* * * * *